United States Patent
Le et al.

(10) Patent No.: US 9,286,717 B2
(45) Date of Patent: Mar. 15, 2016

(54) 3D MODELING MOTION PARAMETERS

(71) Applicant: Hewlett-Packard Development Company, L.P., Houston, TX (US)

(72) Inventors: Vuong Le, Urbana, IL (US); Wei Hong, Sunnyvale, CA (US); Kar-Han Tan, Sunnyvale, CA (US); John Apostolopoulos, Palo Alto, CA (US)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 256 days.

(21) Appl. No.: 13/954,697

(22) Filed: Jul. 30, 2013

(65) Prior Publication Data

US 2015/0035820 A1 Feb. 5, 2015

(51) Int. Cl.
*G06T 17/00* (2006.01)
*G06T 7/00* (2006.01)
*G06T 7/20* (2006.01)

(52) U.S. Cl.
CPC .............. *G06T 17/00* (2013.01); *G06T 7/0071* (2013.01); *G06T 7/2033* (2013.01); *G06T 2200/04* (2013.01); *G06T 2200/08* (2013.01); *G06T 2207/10016* (2013.01); *G06T 2207/10024* (2013.01); *G06T 2207/10028* (2013.01)

(58) Field of Classification Search
CPC ....................................................... G06T 17/00
See application file for complete search history.

(56) References Cited

U.S. PATENT DOCUMENTS

| | | | |
|---|---|---|---|
| 8,031,906 B2 | 10/2011 | Fujimura et al. | |
| 8,284,847 B2 | 10/2012 | Adermann | |
| 2007/0031064 A1* | 2/2007 | Zhao et al. | 382/285 |
| 2011/0069760 A1 | 3/2011 | Lee et al. | |
| 2011/0316980 A1* | 12/2011 | Dubbelman et al. | 348/47 |
| 2012/0194644 A1* | 8/2012 | Newcombe et al. | 348/46 |
| 2012/0293635 A1 | 11/2012 | Sharma et al. | |

OTHER PUBLICATIONS

Bleiweiss, Amit, et al., "Robust Head Pose Estimation by Fusing Time-of-Flight Depth and Color", School of Computer Science: Hebrew University of Jerusalem; Jerusalem, Israel, Oct. 4-6, 2010.< http://www.cs.huji.ac.il/~werman/Papers/headpose_mmsp2010_final.pdf>.

Van Den Bergh, Michael, et al., "Combining RBG and ToF Cameras for Real-time 3D Hand Gesture Interaction", Jan. 5-7, 2011, pp. 66-72. <http://www.vision.ee.ethz.ch/publications/papers/proceedings/eth_biwi_00893.pdf>.

* cited by examiner

*Primary Examiner* — Maurice L McDowell, Jr.
(74) *Attorney, Agent, or Firm* — Mannava & Kang, P.C.

(57) ABSTRACT

According to an example, 3D modeling motion parameters may be simultaneously determined for video frames according to different first and second motion estimation techniques. In response to detecting a failure of the first motion estimation technique, the 3D modeling motion parameters determined according to the second motion estimation technique may be used to re-determine the 3D modeling motion parameters according to the first motion estimation technique.

15 Claims, 5 Drawing Sheets

3D MODELING MOTION PARAMETERS

BACKGROUND

Three-dimensional (3D) modeling of objects has become prevalent for many applications including robotics, navigation, gaming, virtual reality and 3D printing. 3D modeling may include capturing information about an object, such as information about the shape and surface of the object, and generating a 3D model of the object. The 3D model represents the object using a collection of points in 3D space.

3D reconstruction may be used to build a 3D model of an object. 3D reconstruction includes the creation of a 3D model from multiple images. The images may be two-dimensional images capturing a scene. If multiple images of the scene are captured then depth may be determined through triangulation, or a depth camera may be used to measure depth to determine the location in 3D space of objects in the scene. Then, data captured for each image is fused together to determine a 3D mesh of the scene to construct the 3D model.

In order to fuse the data captured from different viewpoints to create a 3D model of the scene, motion estimation (ME) is performed to determine the pose (e.g., pan, tilt, roll, X, Y, Z) of the camera for each video frame of the captured scene. For some applications, ME may be performed in real-time at a full frame rate, e.g., 30 frames per second (fps). For example, for interactive 3D reconstruction, users see the reconstructed model in real-time as video of the scene is captured and can adjust the camera accordingly based on the visual representation of the model.

BRIEF DESCRIPTION OF DRAWINGS

The embodiments are described in detail in the following description with reference to examples shown in the following figures.

DETAILED DESCRIPTION OF EMBODIMENTS

Figure 1:
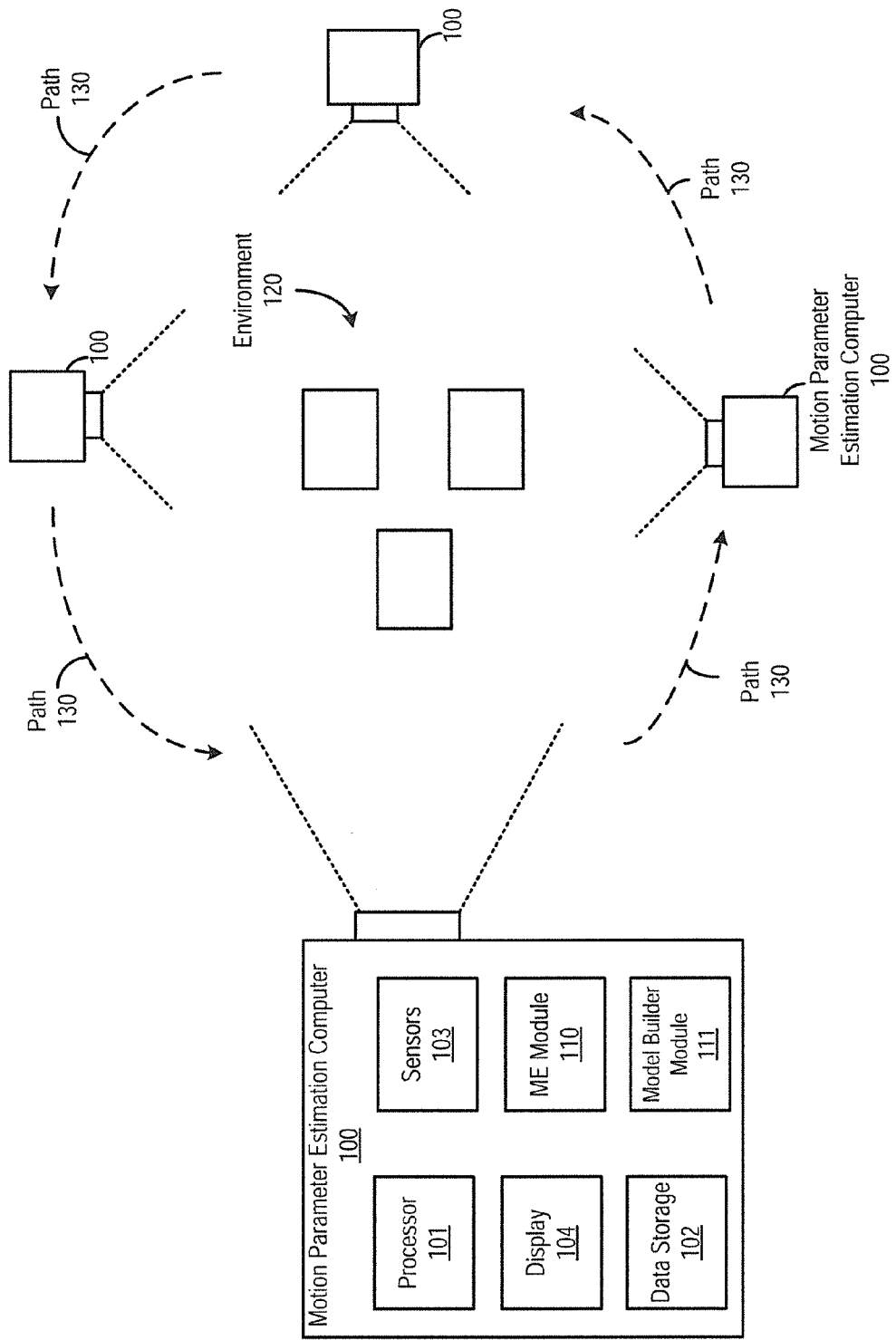
FIG. 1 illustrates an example of a motion estimation computer capturing an environment.

For simplicity and illustrative purposes, the principles of the embodiments are described by referring mainly to examples thereof. In the following description, numerous specific details are set forth in order to provide a thorough understanding of the embodiments. It is apparent that the embodiments may be practiced without limitation to all the specific details. Also, the embodiments may be used together in various combinations.

According to an example, multiple ME techniques are simultaneously applied to determine 3D modeling motion parameters, referred to herein as motion parameters, for 3D reconstruction. 3D reconstruction is the generation of a 3D model of an environment from multiple images of the environment captured at different viewpoints. An environment includes one or more objects, and the images may be video of the environment. An ME technique may include a function that determines motion parameters from data captured for the video frames. The motion parameters describe the location and orientation of sensors capturing the video and related information. For example, the sensors may include visual sensors and depth. The visual sensors may include a video camera. The motion parameters may include rotation parameters, translation parameters, and/or a scaling parameter. For example, the motion parameters may include location in 3D space (e.g., X, Y, Z) of the sensors and orientation (e.g., pan, tilt and roll) of the sensors. The motion parameters may be determined for each frame. Also, motion parameters are determined by each of the multiple ME techniques, so multiple sets of motion parameters, such as one set for each ME technique, may be determined for each video frame.

The ME techniques may be complementary in robustness and in speed. For example, if an error is detected for motion parameters determined by one of the ME techniques, the motion parameters determined by the other technique may be used to recover from the error. Also, the ME techniques may run at different frame rates. For example, one ME technique may run in real-time or close to real-time, such as 30 fps, and one may run slower. If errors are detected in the motion parameters determined by either technique, the motion parameters from the other may be used to recover from the error.

In one example, the ME techniques include a depth-based ME technique and a red, green, blue (RGB)-based ME technique. The depth-based ME technique determines the motion parameters from depth information captured by a depth sensor. A depth sensor measures distance to objects in an environment. An example of a depth sensor is a time-of-flight camera. The RGB-based ME technique determines the motion parameters from information captured by an RGB sensor which is commonly used in cameras. The RGB sensor may generate pixels of the captured image, and each pixel provides an intensity measurement of each color. The depth sensor may generate depth measurements for each pixel. RGB-D cameras are available that measure both visual (e.g., RGB pixels) and depth per-pixel.

An example of the depth-based ME technique is iterative closest point (ICP). ICP minimizes the distance between two cloud points. Each cloud may include a set of depth measurements for a video frame that are captured by the depth sensor. ICP aligns the cloud points for two frames. Generally, ICP associates points for the clouds, estimates transformation parameters using a mean square cost function, transforms the points using the estimated parameters, and iterates to re-associate the points. Alignment of the clouds is determined from the point associations, and the motion parameters are determined based on the aligned clouds. The ICP function is widely used for 3D modeling and can run in real-time, such as at the frame rate of the video.

An example of RGB-based ME may include determining a set of feature points for each frame from the pixels captured by the RGB sensor, and aligning the feature points with feature points of a previous frame to determine correspondence pairs. In one example, speeded up robust feature (SURF) may be used to determine correspondence between feature points in two frames. The feature points are then mapped to the depth frames to get the 3D coordinates of the corresponding pairs. The motion parameters are calculated by solving the least square problem which minimizes the distances between these corresponding pairs in 3D. Random sample consensus (RANSAC) may be used to discard outliers to determine the motion parameters.

Depth-based ME (e.g., using ICP) can run in real-time for example at the video frame rate (e.g., 30 fps), but tracking gets lost when inter-frame motion is large, which can easily happen on a mobile device capturing the video in the hands of a casual user. RGB-based can be more robust but is more compute-intensive and may run as a slower rate, e.g., 15 fps. According to an example, the depth-based ME may be used to determine the motion parameters in real-time and the RGB-based ME may be used if an error is detected in the depth-based ME.

Forward and backward motion parameter transferring may be performed for error recovery. For forward motion parameter transferring, after each set of motion parameters are estimated by RGB-based ME, they are saved and may be used by the depth-based ME for future failure recovery. For backward motion parameter transferring, if error of the depth-based ME motion parameters is lower than a threshold, the motion parameters from the depth-based ME may be used to reset the RGB-based ME. Conventional RGB-based ME aligns a current frame to the previous frame, which can cause drift error to accumulate over frames. For backward motion parameter transferring, the RGB-based ME is aligned based on motion parameters determined from the depth-based ME, which can minimize drift. Alignment based on the depth-based ME may be performed periodically, such as when an anchor frame is identified.

Anchor frames may also be used for backing up a 3D model. A 3D model can be contaminated with poorly aligned data before an ME error is detected since it may take a few frames before a depth-based ME error crosses an error detection threshold. Therefore, if the motion parameters are merely corrected, the resulting 3D model which is generated as the motion parameters are determined for the frames may be irreversibly corrupted. To prevent this from happening, one frame out of every certain number of frames (e.g., every $6^{th}$ frame but a different periodicity may be used) is considered an anchor frame. For the depth-based ME, when an anchor frame is identified, the 3D model is stored for example in a dedicated memory. When failure occurs, the backed-up model for the previous anchor frame is restored to align new frames.

FIG. 1 illustrates an example of motion parameter estimation computer 100. The motion parameter estimation computer 100 may include hardware, such as processor 101 and data storage 102. More than one processor may be used in the motion parameter estimation computer 100. Sensors 103 capture information about the environment 120 which may include one or more objects. The sensors 103 may include a visual sensor and a depth sensor. The visual sensor may include a video camera sensor to capture video of the environment 120. The visual sensor may generate ROB pixels. The depth sensor may capture distance from the sensor to the objects in the environment 120.

An ME module 110 may determine motion parameters for the captured video according to multiple ME techniques, such as the depth-based ME and the RGB-based ME described above. The ME module 110 may determine when error for motion parameters exceed a threshold and perform error recovery to determine more accurate motion parameters. Forward and backward motion parameter transferring may be performed for error recovery. The model builder module 111 may build a 3D model of the environment 120 from the data captured from the sensors 103, such as two-dimensional images from video and depth measurements, and from the motion parameters determined by the ME module 110.

The functions and methods described herein may be embodied as machine readable instructions stored on a non-transitory computer readable medium, such as the data storage 102, and executed by the processor 101. For example, the ME module 110 and the model builder module 111 may comprise machine readable instructions stored in the data storage 102 and executed by the processor 101. The data storage may comprise memory or other types of volatile and/or nonvolatile data storage. The data storage 102 may store any information used or generated by the motion parameter estimation computer 100, including data captured by the sensors 103, motion parameters, 3D models, etc. The motion parameter estimation computer 100 may include a display 104 and/or other input/output devices. The display 104 may display a 3D model as it is reconstructed from the video. The components of the motion parameter estimation computer 100 may be in one housing or multiple housings. For example, the sensors 103 may be in an RGB-D camera connected to the motion parameter estimation computer 100 via a wired or wireless interface.

To generate the 3D model of the environment 120, the environment 120 is captured by the sensors 103 from different viewpoints. For example, the motion parameter estimation computer 100 or a camera including the sensors and provided separately is moved along the path 130 to capture video and depth measurements of the environment 120 from different viewpoints. If the user wants to create a 3D model of the entire environment 120, then video and depth measurements are captured from all sides. As the video and depth measurements are captured, the motion parameter estimation computer 100 may build the 3D model and display it on the display 104. The user may recapture or adjust the video if the displayed model is not being generated correctly, such as slowing the movement of the camera as the video is captured or stabilizing the camera. Instead of moving along the path 130 or in addition to moving along the path 130, the user may rotate the camera to capture different viewpoints of the environment 130. The pose of the camera changes to capture different viewpoints, and the motion parameters estimate the pose of the camera to build the 3D model.

Figure 2:
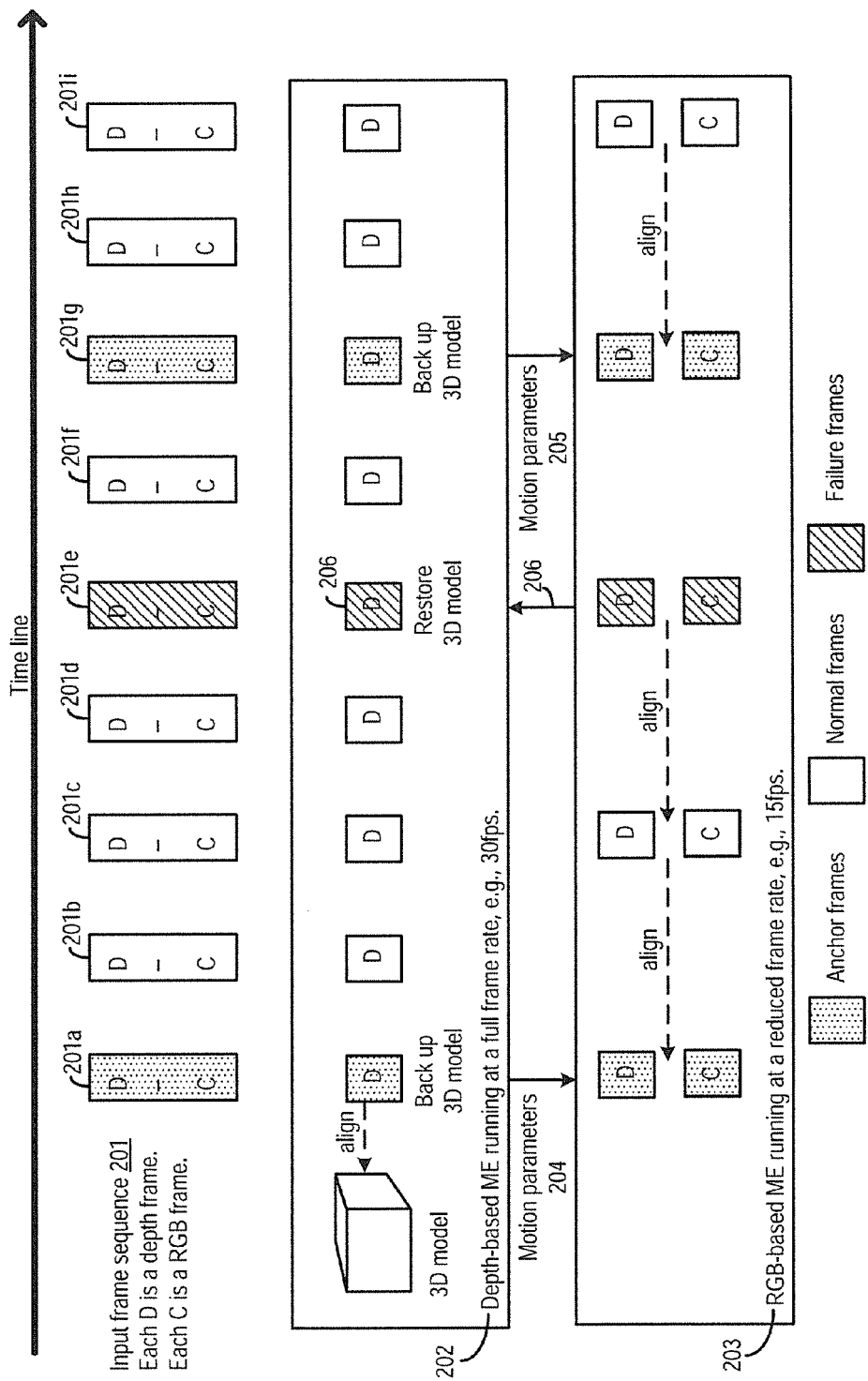
FIG. 2 illustrates an example of a timeline for determining motion parameters.

FIG. 2 illustrates an example of determining motion parameters according to multiple ME techniques and further illustrates error recovery. The motion parameter estimation computer 100 shown in FIG. 1 may determine the motion parameters and perform the error recovery.

FIG. 2 shows a timeline of the video frames captured by the sensors 103 of the environment 120 for example as the sensors 103 are moved along the path 130 shown in FIG. 1. The output of the sensors 103 for example are depth frames shown as D and RGB frames shown as C in the input frame sequence 201 in FIG. 2. The RGB and depth frames may include RGB pixels and depth per pixel, respectively. The input sequence 201 is input to the ME module 110 shown in FIG. 1 to determine the motion parameters.

As shown in FIG. 2, depth-based ME 202 and RGB-based ME 203 are performed simultaneously to determine a set of motion parameters for each frame and for each ME technique. Simultaneously determining motion parameters may include executing the different ME techniques (e.g., the depth-based ME 202 and the RGB-based ME 203) at the same time. The ME techniques are performed on the captured video frames to determine the motion parameters for each ME technique and each frame. The depth-based ME 202 may include ICP performed on point clouds derived from the depth frames in the input frame sequence 201. To prevent drifting, instead of aligning the point cloud of a frame to a point cloud of a previous frame, it is aligned to a reference point cloud which is extracted from the 3D model generated from the depth frames. By executing the ICP function, the ME module 110 determines the motion parameters for each frame. The depth-based ME may run at full frame rate, so the motion parameters can be determined for each frame in real-time and the 3D model can be constructed in real-time.

To determine the motion parameters according to ICP, depth measurements for the current frame are determined. A point cloud is determined from the depth measurements. A reference point cloud from the 3D model constructed from previous frames is determined. The point cloud is aligned with the reference point cloud according to ICP and the motion parameters are determined for the current frame from the alignment.

The RGB-based ME 203 detects a set of interest points in the RGB frame and extracts their features. The feature points are then aligned with those of the previous frame to find correspondence pairs. The feature points are then mapped to the depth frames to get the 3D coordinates of these corresponding pairs. The motion parameters are calculated by solving the least square problem which minimizes the distances between these corresponding pairs in 3D.

The RGB-based ME 203 runs at a reduced frame rate, e.g., 15 fps. In this example, the video is captured at 30 fps and the RGB-based ME 203 determines motion parameters for every other frame, such as frames 201a, 201c, 201e, etc.

Anchor frames, normal frames and failure frames are shown in FIG. 2. The anchor frames in this example are every $6^{th}$ frame, such as at frames 201a and 201g, but may be selected for any of the frames. For the depth-based ME 202, when an anchor frame is generated, the 3D model constructed from the anchor frames is backed up. For example, the data storage 102 may include a dedicated memory for the back-up or a dedicated portion of memory. When failure occurs, the backed-up model is restored to align data for a current frame. Also, at the anchor frames, if error of the depth-based ME 202 is lower than a threshold, the motion parameters from the depth-based ME 202 are used to align the RGB-based ME 203, which is shown at 204 and 205.

The normal frames are any frames that are not an anchor frame or a failure frame. The failure frames are when an error is detected. For example, for the depth-based ME 202, ME error is monitored and if the ME error is greater than a threshold, the failure recovery process is triggered, which is shown at frame 201e. When failure is detected, the current states of the ME processes 202 and 203 freeze and motion parameters from the RGB-based ME 203 are used for the depth-based ME 202, such as shown at 206. For example, the recovery procedure is activated and the motion parameters provided by the RGB-based ME 203 are used to reset depth-based ME initialization. ME initialization may include resetting rotation and translation values to defaults. One more depth-based ME may be executed to refine the alignment of the current frame. After recovering from failure, the system returns to the normal procedure.

Figure 3:
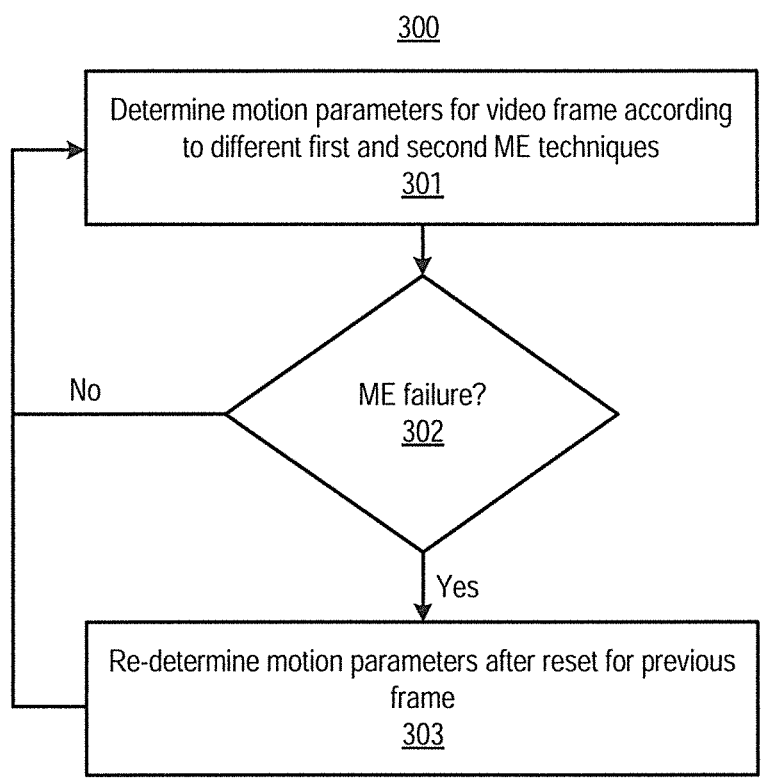
FIG. 3 illustrates an example of a method to determine motion parameters.

FIG. 3 illustrates a method 300 according to an example for determining motion parameters. The methods 300 and 400 may be performed by the motion parameter estimation computer 100 or other systems. For example, at 301, the motion parameter estimation computer 100 simultaneously determines, at different frame rates, motion parameters for the same frames in video according to different first and second ME techniques. For example, the first ME technique is the depth-based ME 202 and the second ME technique is the RGB-based ME 203 shown in FIG. 2.

To determine the motion parameters according to ICP for the depth-based ME 202, depth measurements for the current frame are determined. A point cloud is determined from the depth measurements. A reference point cloud from the 3D model constructed from previous frames is determined. The point cloud is aligned with the reference point cloud according to ICP and the motion parameters are determined for the current frame from the alignment. For example, ICP associates points in a current frame to the previous frame according to a nearest neighbor criteria. For example, for each point in a point cloud from one frame, the closest point in a second point cloud of the other frame is identified. Transformation parameters, such as rotation and translation, are determined using a mean square cost function. For example, as disclosed in "Iterative Point Matching for Registration of Free-Form Curves and Surfaces" by Zhengyou Zhang (1992), after 3-D points in a frame are paired with a set of closest points in another frame, denoted respectively by $\{x_i\}$ and $\{y_i\}$, whereby N is the number of pairs and R is the rotation and t is translation, rotation and translation motion parameters are computed by minimizing the following mean-squares objective function: $F(R,t)=1/N\Sigma_{i=1}^{N}\|Rx_i+t-y_i\|^2$. The points are transformed using the estimated parameters and the procedure is iterated.

In one example of RGB-based ME, a set of feature points for each frame are determined from the pixels captured by the RGB sensor, and the feature points are matched with feature points of a previous frame to determine correspondence pairs. In one example, speeded up robust feature (SURF) may be used to determine correspondence between feature points in two frames. The feature points are then mapped to the depth frames to get the 3D coordinates of the corresponding pairs. The motion parameters are calculated by solving the least square problem which minimizes the distances between these corresponding pairs in 3D. Random sample consensus (RANSAC) may be used to discard outliers to determine the motion parameters.

At 302, the motion parameter estimation computer 100 determines whether an error is detected in the motion parameters determined by the first motion estimation technique for a current frame of the frames. For example, the depth-based ME uses ICP to calculate an ME error and compares the ME error to a threshold. In one example, the error is $|RX+T-X'|$, where X and X' are a corresponding pair of feature points, R is a rotation matrix and T is a translation vector determined from the motion estimation. For example, the threshold can be 1 pixel, or 0.1 pixel subject to user's tuning.

At 303, if an error is detected, the motion parameter estimation computer 100 re-determines the motion parameters for the current frame based on the motion parameters determined by the second motion estimation technique for a previous frame or the current frame. For example, assume the current frame is the frame 201e shown in FIG. 2. The current frame refers to the frame currently being processed by the ME techniques 202 and 203 to determine the motion parameters. An error is detected at frame 201e from the depth-based ME 202. The motion parameters determined by the RGB-based ME 203 for the frame 201e are determined and stored. These motion parameters are used to reset the depth-based ME initialization for the frame 201e Then, the depth-based ME 202 is re-executed to refine the alignment of the current frame 201e. After recovering from failure, the motion estimation returns to the normal procedure, where the next frame is processed to determine the motion estimation parameters. If there are no motion parameters determined by the RGB-based ME 203 for the current frame for failure recovery, such as frame 201b, then the motion parameters from the previous frame are used, such as frame 201a, and the depth-based ME 202 is reset for the previous frame according to the ROB-based ME motion parameters for the previous frame. Then, the depth-based ME 202 is re-determined after reset for the previous frame and normal processing continues.

Figure 4:
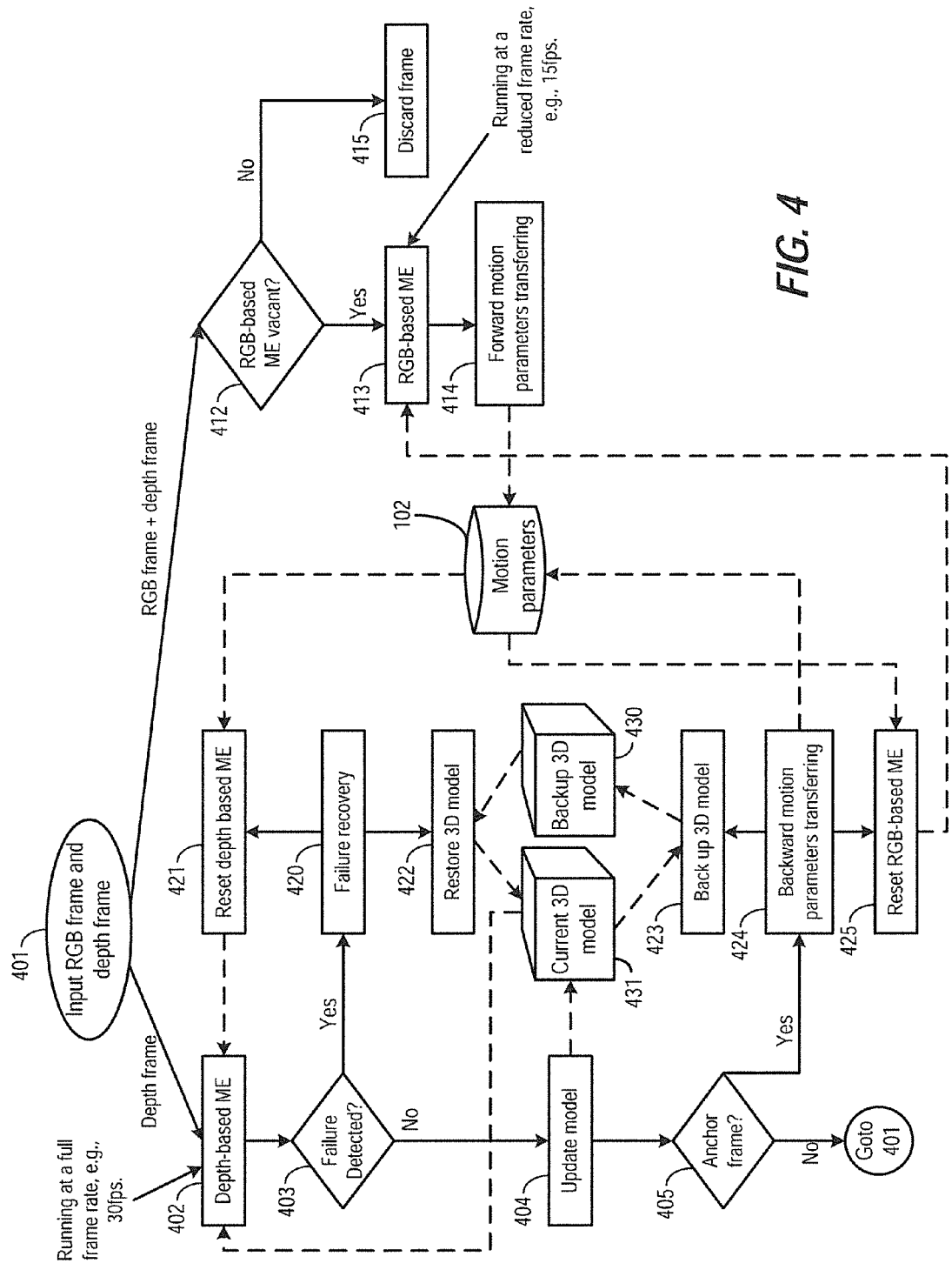
FIG. 4 illustrates an example of a method and data flow for determining motion parameters.

FIG. 4 illustrates more details for determining the motion parameters. FIG. 4 is a process and data flow diagram. The solid lines represent the process flow and the dotted lines represent the data flow. The left side of FIG. 4 represents steps for the depth-based ME 202 and the right side represents steps for the RGB-based ME 203. As can be seen, the depth-based ME 202 and the RGB-based ME 203 run simultaneously. The steps in the middle include failure recovery and backup steps.

At 401, the RGB frame and depth frame are determined for example from data captured by the sensors 103 of the motion parameter estimation computer 100 shown in FIG. 1. At 402 depth-based ME 202 is performed, and at 412 and 413 RGB-based ME 203 is performed. For example, with respect to the RGB-based ME 203, the motion parameter estimation computer 100 determines whether the RGB-based ME 203 is vacant at 412. For example, the motion parameter estimation computer 100 determines whether the RGB-based ME for the previous frame has completed. If it has, the RGB-based ME 203 is performed for the current frame at 413. At 413, the RGB-based ME 203 may use the motion parameters from the depth-based ME 202 to reset the RGB-based ME. For backward motion parameter transferring, the RGB-based ME may be aligned based on motion parameters determined from the depth-based ME, which can minimize drift if the frame is an anchor frame. If no at 412, the current RGB frame is discarded at 415 or may be kept but is not processed. At 414, forward motion parameter transferring is performed. For example, the motion parameters determined from the RGB-based ME 203 are stored in the data storage 102 and are available to be used for failure recovery if needed.

With respect to the depth-based ME 202, at 403, a determination is made as to whether a failure is detected (e.g., ME error determined from ICP is less than threshold). If failure is detected, at 420, failure recovery is performed. For example, at 421, the depth-based ME 202 is reset based on stored motion parameters determined by the RGB-based ME 203. Then, the depth-based ME 202 is performed again after rest at 402. At 422, the backup 3D model 431 is restored as the current 3D model 431 and the current 3D model 431 is used for the depth-based ME 202 to align the point cloud for the current frame with the previous frame. If no failure was detected, at 402, the current 3D model 431 is still used for the depth-based ME 202 to align point clouds, but the current 3D model 431 is not the backup model 430 but is instead the current 3D model that is constructed from the previous frame.

At 404, the current 3D model 431 is updated to include the data captured from the sensors 103 for the current frame. At 405, a determination is made as to whether the current frame is an anchor frame. If the current frame is an anchor frame, at 424, backward motion parameter transferring is performed. For example, if the ME error is less than the threshold, the motion parameters determined from the depth-based ME 202 are stored in the data storage 102 and at 425 can be used to reset the RGB-based ME 203 which can minimize drift error accumulation. Also, at 423, the 3D model is backed up.

Figure 5:
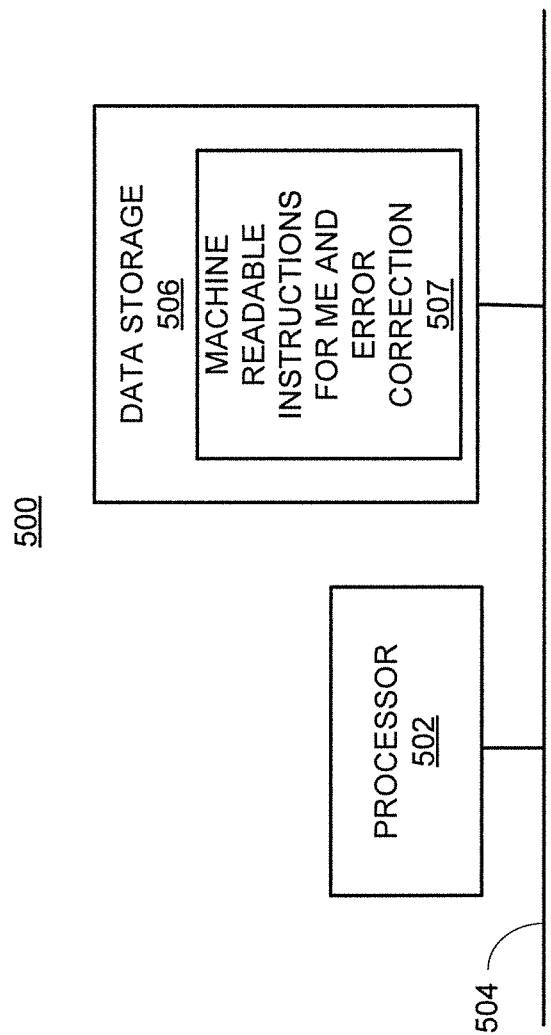
FIG. 5 illustrates an example of a computer system that may implement the methods and functions described herein.

FIG. 5 shows a computer system 500 that may be used with the examples described herein. The computer system may represent a generic platform that includes components that may be in a server or another computer system. The computer system 500 may be used as a platform for the motion parameter estimation computer 100. The computer system 500 may execute, by a processor (e.g., processor 502) or other hardware processing circuit, the methods, functions and other processes described herein. These methods, functions and other processes may be embodied as machine readable instructions stored on a computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system 500 may include at least one processor 502 that may execute machine readable instructions performing some or all of the methods, functions and other processes described herein. The processor 101 shown in FIG. 1 may be the processor 502. Commands and data are communicated over a communication bus 504. The computer system also includes a data storage 506, which may include memory, a hard drive, a solid state drive and/or other types of data storage devices. The data storage 506 may include the data storage 102 shown in FIG. 1. Machine readable instructions 507 may be stored in the data storage 506 and executed by the processor 502. The machine readable instruction 507 for example are for the ME and motion parameter error correction described above and any of the other functions described above. Although not shown, the computer system 500 may include other components, such as a network interface or other type of interface for communicating with external systems and an I/O device, such as a keyboard, a mouse, a display, etc.

While the embodiments have been described with reference to examples, various modifications to the described embodiments may be made without departing from the scope of the claimed embodiments.

What is claimed is:

1. A motion estimation computer to determine 3D modeling motion parameters, the motion estimation computer comprising:
   at least one processor; and
   a data storage to store determined 3D modeling motion parameters for video frames and to store instructions that when executed by the at least one processor cause the at least one processor to:
   simultaneously determine the 3D modeling motion parameters for video frames according to different first and second motion estimation techniques, wherein in response to detecting a failure of the first motion estimation technique for a current frame of the frames, the at least one processor is to re-determine, according to the first motion estimation technique, the 3D modeling motion parameters for the current frame from the motion parameters determined according to the second motion estimation technique for a previous frame of the frames or the current frame.

2. The motion estimation computer of claim 1, wherein to determine the motion parameters according to the first motion estimation technique, the instructions are further to cause the at least one processor to:
   determine depth measurements for the current frame of an environment;
   determine a point cloud from the depth measurements for the current frame;
   determine a reference point cloud from a 3D model of the environment generated from a previous frame;
   align the point cloud with the reference point cloud according to an iterative closest point function; and
   determine the 3D modeling motion parameters for the current frame according to the first motion estimation technique according to the alignment.

3. The motion estimation computer of claim 2, wherein the instructions are further to cause the at least one processor to:
   determine a motion estimation error from the alignment;
   determine whether the error exceeds a threshold; and
   in response to the error exceeding the threshold, determine the failure occurred.

4. The motion estimation computer of claim 1, wherein to determine the 3D modeling motion parameters according to the second motion estimation technique, the instructions are further to cause the at least one processor to:
  determine red, green, blue (RGB) measurements for the frames; and
  for each frame, determine feature points from the RGB measurements, align the feature points for the frame with feature points of a previous frame to find correspondence pairs, map the aligned feature points with a depth map to determine 3D coordinates of these corresponding pairs, and determine the motion parameters by solving a least square problem minimizing distances between the corresponding pairs of the feature points based on the 3D coordinates.

5. The motion estimation computer of claim 1, wherein the instructions are further to cause the at least one processor to:
  determine depth measurements for the current frame; and
  update a 3D model based on the depth measurements, wherein the motion parameters for a future frame are determined from the updated 3D model according to the first motion estimation technique.

6. The motion estimation computer of claim 1, wherein if the failure is detected, the instructions are further to cause the at least one processor to determine the re-determined 3D modeling motion parameters from a backup 3D model determined from a previous frame wherein no error was detected.

7. The motion estimation computer of claim 1, wherein if the failure is detected, the instructions are further to cause the at least one processor to initialize the first motion estimation technique for the current frame from the 3D modeling motion parameters determined according to the second motion estimation technique for the current frame prior to re-calculated the 3D modeling motion parameters.

8. The motion estimation computer of claim 1, wherein for an anchor frame of the frames, the instructions are further to cause the at least one processor to determine a motion estimation error for the first motion estimation technique, and if the motion estimation error is less than a threshold, determine the 3D modeling motion parameters according to the second motion estimation technique for a future frame of the frames based on the anchor frame 3D modeling motion parameters determined according to the first estimation technique.

9. The motion estimation computer of claim 8, wherein if the frame is an anchor frame, the instructions are further to cause the at least one processor to back up a 3D model updated according to the first motion estimation technique.

10. The motion estimation computer of claim 1, wherein the second motion estimation technique runs at a slower frame rate than the first motion estimation technique.

11. A non-transitory computer readable medium storing machine readable instructions executable by at least one processor to:
  simultaneously determine 3D modeling motion parameters from video frames of an environment according to a depth-based motion estimation technique and a red, green, blue (RGB)-based motion estimation technique; and
  in response to detecting a failure of the depth-based motion estimation technique for a current frame of the frames, re-determine, according to the depth-based motion estimation technique, the 3D modeling motion parameters for the current frame from the motion parameters determined for the current frame or a previous frame of the frames according to the RGB-based motion estimation technique.

12. The non-transitory computer readable medium of claim 11, wherein depth and RGB measurements are captured for each frame, and the 3D modeling parameters are determined from the measurements.

13. The non-transitory computer readable medium of claim 11, wherein the machine readable instructions are executable by the at least one processor to update a 3D model of the environment generated from the depth measurements for the current frame if no failure of the depth-based motion estimation technique for the current frame is detected.

14. A method comprising:
  simultaneously determining by at least one processor at different frame rates, 3D modeling motion parameters for video frames according to different first and second motion estimation techniques;
  detecting an error in the first motion estimation technique for a current frame of the frames; and
  re-determining the 3D modeling motion parameters for the current frame according to the first motion estimation technique based on the motion parameters determined according to the second motion estimation technique for the current frame or a previous frame of the frames.

15. The method of claim 14, wherein the first motion estimation technique is a depth-based motion estimation technique utilizing depth measurements for each frame and the second motion estimation technique is an RGB-based motion estimation technique utilizing RGB measurements for each frame.

* * * * *